(12) United States Patent
Clonan

(10) Patent No.: US 8,505,490 B1
(45) Date of Patent: Aug. 13, 2013

(54) FISH TANK DECOR ASSEMBLY

(71) Applicant: Christopher Clonan, Bronx, NY (US)

(72) Inventor: Christopher Clonan, Bronx, NY (US)

( * ) Notice: Subject to any disclaimer, the term of this patent is extended or adjusted under 35 U.S.C. 154(b) by 0 days.

(21) Appl. No.: 13/664,776

(22) Filed: Oct. 31, 2012

(51) Int. Cl.
*A01K 63/00* (2006.01)

(52) U.S. Cl.
USPC .......................................... 119/253; 119/256

(58) Field of Classification Search
USPC .......................................... 119/253, 256, 257
See application file for complete search history.

(56) References Cited

U.S. PATENT DOCUMENTS

| | | | | |
|---|---|---|---|---|
| 4,678,150 A | * | 7/1987 | Newman et al. | 248/205.3 |
| 4,708,089 A | * | 11/1987 | Goldman et al. | 119/248 |
| 4,709,657 A | * | 12/1987 | Gothard | 119/253 |
| 4,820,556 A | * | 4/1989 | Goldman et al. | 428/7 |
| 5,067,059 A | * | 11/1991 | Hwang | 362/101 |
| 5,857,430 A | * | 1/1999 | Griffiths | 119/256 |
| 6,148,770 A | * | 11/2000 | Lin | 119/253 |
| 6,484,428 B1 | * | 11/2002 | Greenwald et al. | 40/600 |
| 6,672,250 B1 | * | 1/2004 | Traylor et al. | 119/256 |
| 6,701,870 B1 | * | 3/2004 | Van Heygen | 119/452 |
| 7,691,468 B2 | * | 4/2010 | Benninger et al. | 428/206 |
| 7,699,277 B2 | * | 4/2010 | Bagnall | 248/206.5 |
| 7,850,134 B2 | * | 12/2010 | Tunza | 248/206.5 |
| 8,037,923 B2 | * | 10/2011 | Alkhoury et al. | 160/369 |

* cited by examiner

*Primary Examiner* — Yvonne Abbott
(74) *Attorney, Agent, or Firm* — The Law Office of Jerry D. Haynes

(57) ABSTRACT

A method of decorating an aquarium comprising the steps of: creating a décor assembly, where the décor assembly includes a background screen and said background screen includes a front side, a rear side with a magnetic lining on the rear side; submerging the décor assembly into the aquarium; and aligning a plurality of magnets along the magnetic lining, where the plurality of magnets are positioned on an outside surface of the aquarium. In one particular embodiment, the step of creating a décor assembly includes permanently attaching an environmental décor to the background screen, where the environmental décor includes at least one of a plant décor and a dwelling décor.

3 Claims, 2 Drawing Sheets

FISH TANK DECOR ASSEMBLY

BACKGROUND OF THE INVENTION

1. Field of Invention

The present invention relates to a fish tank decor assembly that is magnetically held into place within a fish tank or aquarium.

2. Description of Related Art

Fish tanks or aquariums are used to house water plants or animals and typically are used to store pet fish. Although other sea dwelling types of animals may be placed in a fish tank, typically fish are placed in the tank as a pet for the owner. Fish tanks vary in size and may be a bowl shaped fish tank or typically a cuboid tank. In addition to sea plants or animals, many times individuals place other decorative pieces within the fish tank to create a decorative environment for viewing of the fish within the tank. Further, fish within the tank may enjoy maneuvering around the decor while dwelling within the tank. Many times the individuals place the decor within the fish tank or aquarium through the use of adhesive paper or suction cups, which adhere to the bottom surface or sides of the aquarium. These methods of insertion and adhesion of the decorative accessories many times require constant replacement or maintenance to ensure that the pieces remain stable and attractive while within the fish tank.

Consequently, it would be advantageous to have a decor assembly that utilizes a alternative method to stabilize and secure fish tank decor within the tank that require less maintenance than the traditional methods of placement and securing decor within a fish tank. Further, it would be advantageous to have such a system or device that may magnetically secure the decor assembly within the fish tank and, therefore, provide an effective means to place a decorative assembly within the fish tank.

SUMMARY OF THE INVENTION

The present invention relates to a method of decorating an aquarium comprising the steps of: creating a décor assembly, where the décor assembly includes a background screen and said background screen includes a front side, a rear side with a magnetic lining on the rear side; submerging the décor assembly into the aquarium; and aligning a plurality of magnets along the magnetic lining, where the plurality of magnets are positioned on an outside surface of the aquarium. In one particular embodiment, the step of creating a décor assembly includes permanently attaching an environmental décor to the background screen, where the environmental décor includes at least one of a plant décor and a dwelling décor.

DETAILED DESCRIPTION

The present invention relates to a fish decor assembly that uses a magnetic means to secure the fish decor assembly within a fish tank. The fish decor assembly uses a magnetic lining placed along the rear side of the decor assembly and magnetics used on the outside surface of the fish tank to ensure the decor remains in a secure position once it is placed within the tank. The fish decor assembly according to the present invention may include plants that extend from a background screen and may include a small cave or other decorative assemblies that are secured directly to the background screen. The background screen of the fish decor assembly is held securely against one side of the fish tank through the use of a magnetic lining along the rear side of the decor assembly and magnets that are placed on the outside surface of the tank. Therefore, attraction between the magnetic lining and magnets secures the fish decor assembly in a secure manner against the rear side of the fish tank.

Figure 1:
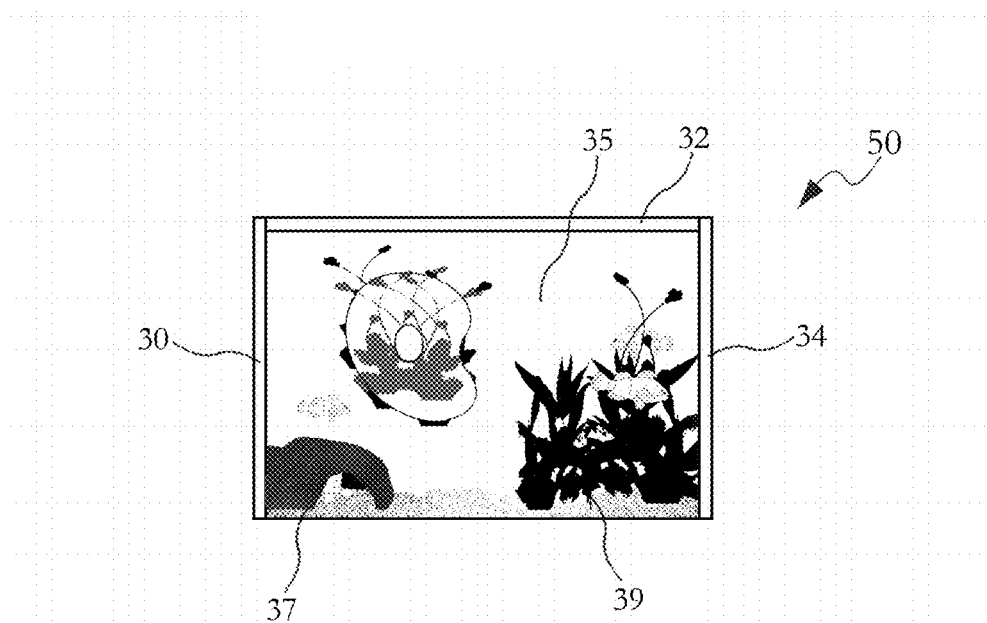
FIG. 1 depicts a front view of a fish tank that includes a magnetically secured fish decor assembly according to the present invention.
Figure 2:
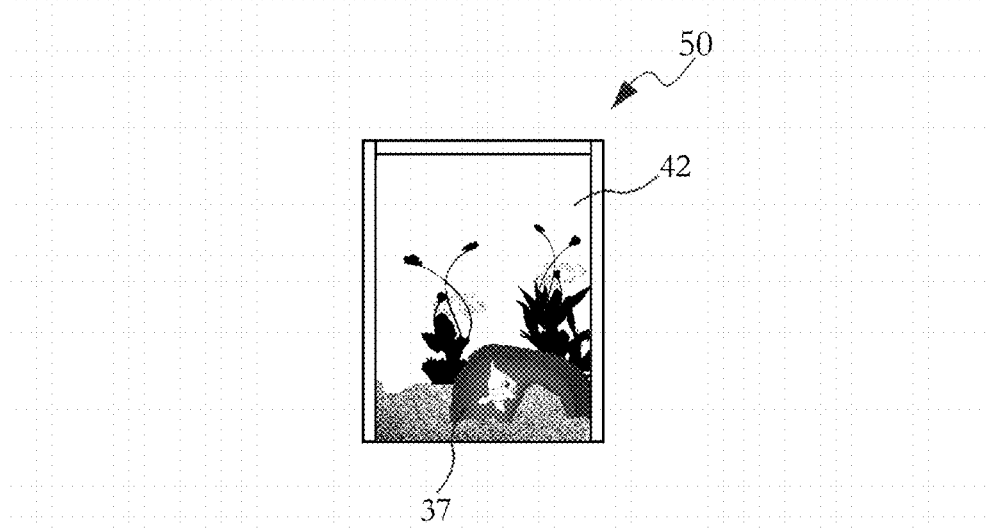
FIG. 2 depicts a side view of the fish tank with the fish decor assembly according to the present invention within the tank.

A fish tank decor assembly is depicted in FIG. 1. The fish tank decor assembly 50 includes a background screen 35 and may include a plant decor 39 as shown. The plant decor 39 adheres permanently to a front side of the background screen 35, where the plant decor 39 may be molded with the screen 35 to create a composite assembly. Also depicted with the decor assembly 50 is a small cave 37. The cave 37 is also permanently attached to the background screen 35. A top border 32 extends across the horizontal top portion of the background screen 35. Two side borders 30, 34 are provided on each side of the background screen 35. The front view provided in FIG. 1 is a depiction of the decor assembly 50 after the assembly 50 has been installed within a fish tank. FIG. 2 provides a side view of the decor assembly 50 installed into a fish tank 42. Further seen within the side view of FIG. 2 is the cave 37. As shown a fish may maneuver through the cave while the decor assembly is within a fish tank.

Figure 3:
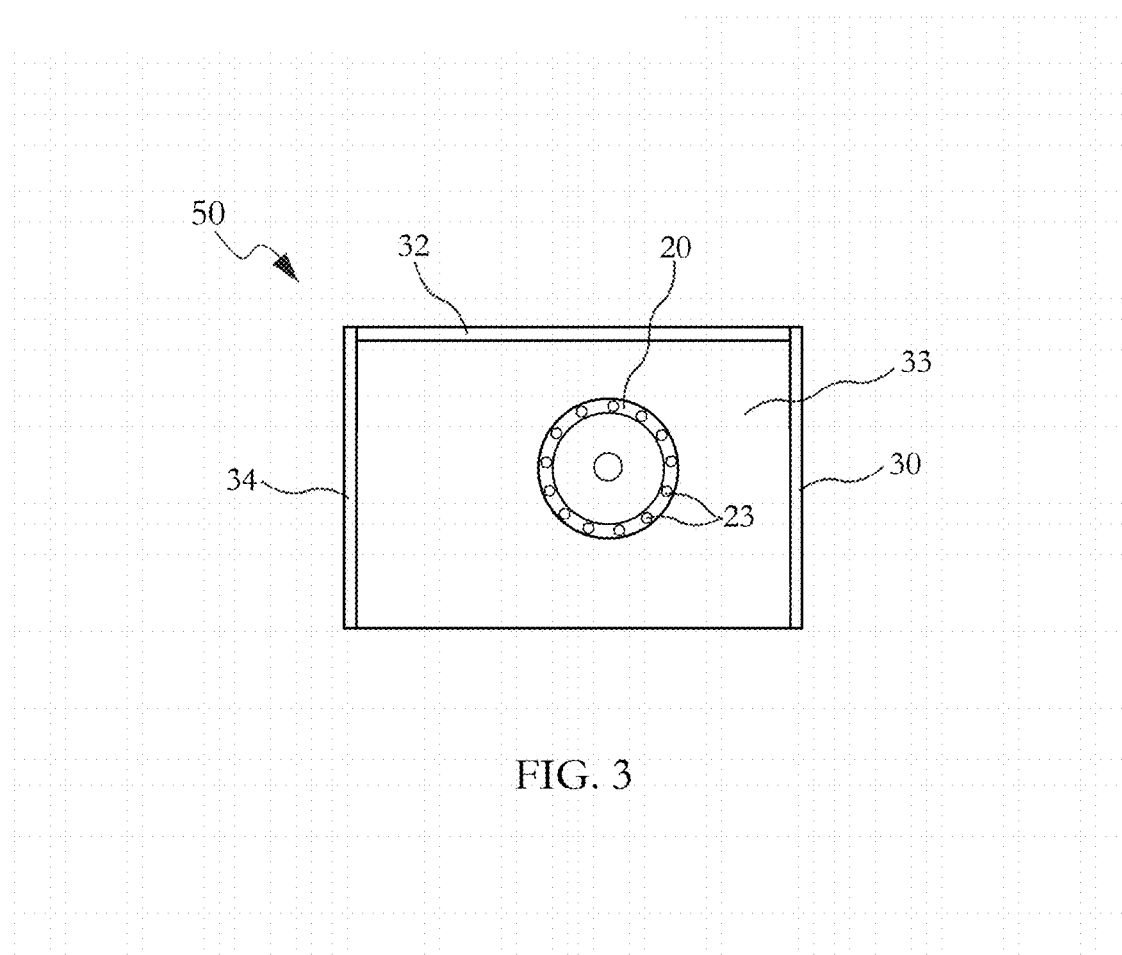
FIG. 3 depicts a rear view of the fish decor assembly and the method of securing the decor assembly within the tank.

As shown in FIG. 3, a rear side 33 of the decor assembly 50 is depicted. The rear side 33 includes a magnetic lining 20 that is depicted in a circular manner. The magnetic lining 20 provides a means to secure the decor assembly 50 in a secure position while emerged in the fish tank. A series of magnets 23 are used on the outside surface of the fish tank and are aligned with the magnetic lining 20 to provide a firm attachment or a securing of the decor assembly once it is emerged within the fish tank.

Consequently, the present invention provides a fish tank decor assembly that is magnetically secured on the rear surface of the fish tank. The rear side of the decor assembly includes a magnetic lining that provides a means to secure the fish decor within the fish tank. Use of the decor assembly according to the present invention provides an effective means to secure a complete decor as shown in FIG. 1 of decorative plants and a cave to provide a background scene for the fish tank. Although plants and a cave were depicted in this particular embodiment, other arrangements or decorative arrangements may be secured to the background screen 35 in order to provide a decorative decor for the fish tank. The instant invention has been shown and described in what it considers to be the most practical and preferred embodiments. It is recognized, however, that departures may be made there from within the scope of the invention and that obvious modifications will occur to a person skilled in the art.

What is claimed is:

1. A method of decorating an aquarium comprising the steps of:
   a. creating a décor assembly, where the décor assembly includes a background screen and said background screen includes a front side, a rear side with a magnetic lining on the rear side;
   b. submerging the décor assembly into the aquarium; and
   c. aligning a plurality of magnets along the magnetic lining, where the plurality of magnets are positioned on an outside surface of the aquarium.

2. The method according to claim 1, where the step of creating a décor assembly includes permanently attaching an environmental décor to the background screen.

3. The method according to claim 2, where the environmental décor includes at least one of a plant décor and a dwelling décor.

* * * * *